US010620632B2

(12) United States Patent
Freeman et al.

(10) Patent No.: US 10,620,632 B2
(45) Date of Patent: Apr. 14, 2020

(54) PORTABLE AERIAL RECONNAISSANCE TARGETING INTELLIGENCE DEVICE

(71) Applicant: Booz Allen Hamilton Inc., McLean, VA (US)

(72) Inventors: James Edward Freeman, McLean, VA (US); Dylan Christopher Williams, McLean, VA (US); Richard Charles Barrett, McLean, VA (US); Dakota Robert Baber, McLean, VA (US); Maria Medina, McLean, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 63 days.

(21) Appl. No.: 15/816,554

(22) Filed: Nov. 17, 2017

(65) Prior Publication Data
US 2018/0088581 A1 Mar. 29, 2018

Related U.S. Application Data

(63) Continuation of application No. PCT/US2016/033102, filed on May 18, 2016.
(Continued)

(51) Int. Cl.
G05D 1/00 (2006.01)
G03B 15/02 (2006.01)
(Continued)

(52) U.S. Cl.
CPC ......... *G05D 1/0094* (2013.01); *B64C 39/024* (2013.01); *B64D 47/02* (2013.01);
(Continued)

(58) Field of Classification Search
None
See application file for complete search history.

(56) References Cited

U.S. PATENT DOCUMENTS 8,955,110 B1 * 2/2015 Twitchell, Jr. ...... G06F 9/45558
726/22
2007/0222968 A1 9/2007 Krasutsky
(Continued)

OTHER PUBLICATIONS

The extended European Search Report dated Nov. 2, 2018, by the European Patent Office in corresponding European Application No. 16835562.6. (9 pages).
(Continued)

Primary Examiner — James M Anderson, II
(74) Attorney, Agent, or Firm — Buchanan Ingersoll & Rooney PC

(57) ABSTRACT

A device for obtaining surveillance information from an aerial vehicle. The device includes a camera configured to obtain image data based on a position of the vehicle, a transceiver configured to receive operator controls and output the obtained image data, a designator unit configured to emit a light source onto a surface of an object of interest to illuminate that surface when a designation command is received from an operator, a gimbal mechanism having a plurality of motors configured to orient the designator unit, a gimbal controller configured to control the motors of the gimbal mechanism, and a controller configured to control the designator unit to continuously emit the light source onto the surface of the object irrespective of the position of the vehicle. The controller compensates for an orientation of the designator unit based on the aerial vehicle's movement such that the designator unit continuously illuminates the object.

15 Claims, 16 Drawing Sheets

Related U.S. Application Data

(60) Provisional application No. 62/163,132, filed on May 18, 2015.

(51) Int. Cl.

| | | |
|---|---|---|
| *G03B 15/00* | (2006.01) | |
| *G03B 17/56* | (2006.01) | |
| *B64D 47/02* | (2006.01) | |
| *B64C 39/02* | (2006.01) | |
| *B64D 47/08* | (2006.01) | |
| *H04N 5/225* | (2006.01) | |
| *H04N 7/18* | (2006.01) | |

(52) U.S. Cl.
CPC ........... *B64D 47/08* (2013.01); *G03B 15/006* (2013.01); *G03B 15/02* (2013.01); *G03B 17/561* (2013.01); *G05D 1/0038* (2013.01); *H04N 5/2256* (2013.01); *H04N 7/185* (2013.01); *B64C 2201/121* (2013.01); *B64C 2201/123* (2013.01); *B64C 2201/127* (2013.01); *B64C 2201/146* (2013.01)

(56) References Cited

U.S. PATENT DOCUMENTS

| | | |
|---|---|---|
| 2009/0316755 A1 | 12/2009 | Collette et al. |
| 2010/0034424 A1* | 2/2010 | Goossen .................. F41G 3/02 382/103 |
| 2010/0228406 A1 | 9/2010 | Hamke et al. |
| 2010/0250022 A1 | 9/2010 | Hines et al. |
| 2012/0012691 A1 | 1/2012 | Dryer et al. |
| 2012/0170024 A1 | 7/2012 | Azzazy et al. |
| 2014/0297067 A1* | 10/2014 | Malay .................. G01C 9/005 701/4 |
| 2014/0336848 A1 | 11/2014 | Saunder et al. |
| 2015/0077558 A1 | 3/2015 | Krause et al. |

OTHER PUBLICATIONS

International Search Report (PCT/ISA/210) dated Jan. 23, 2017, by the Japanese Patent Office as the International Searching Authority for International Application No. PCT/US2016/033102.

Written Opinion (PCT/ISA/237) dated Jan. 23, 2017, by the Japanese Patent Office as the International Searching Authority for International Application No. PCT/US2016/033102.

\* cited by examiner

Laser Designator Unit

PORTABLE AERIAL RECONNAISSANCE TARGETING INTELLIGENCE DEVICE

FIELD

The present disclosure provides a remotely controllable device for performing aerial reconnaissance, investigation and targeting.

BACKGROUND

In certain military, recovery, emergency and law enforcement situations, it is desirable to obtain reconnaissance and other intelligence about a particular area of interest (e.g., a location and/or building), but it may be dangerous to do so. For example, in the case of an emergency such as an earthquake or fire, first-responders may wish to discover information about an area of interest, but doing so would put the first-responders in harm's way. As another example, if a military team is deployed to an area of interest to obtain reconnaissance or other information about the area of interest, such as an encampment of adversaries, or identify the area as a target, there may be too many adversaries in the area, and large external reconnaissance assets will not be overhead the area for quite some time. In such a situation, it may be dangerous for the military team to approach the area.

SUMMARY

An exemplary embodiment of the present disclosure provides a device for obtaining surveillance information from an aerial vehicle. The exemplary device includes a camera configured to obtain image data of an object of interest based on a position of the aerial vehicle, and a transceiver configured to receive operator controls and to output the image data obtained by the camera. In addition, the exemplary device includes a designator unit configured to emit a light source onto a surface of an object of interest to illuminate that surface when a designation command is received from an operator. Further, the exemplary device includes a gimbal mechanism having a plurality of motors configured to orient the designator unit, and a gimbal controller configured to control the plurality of motors of the gimbal mechanism. The exemplary device also includes a central controller configured to receive flight information of the aerial vehicle based on the position of the aerial vehicle, and to control the designator unit to continuously emit the light source onto the surface of the object of interest irrespective of the position of the vehicle. The central controller is configured to compensate for an orientation of the designator unit based on movement of the aerial vehicle such that the designator unit continuously illuminates the surface of the object of interest.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION OF EXEMPLARY EMBODIMENTS

The present disclosure provides a portable aerial reconnaissance targeting intelligence (PARTI) device 100 which can obtain and record intelligence, surveillance and reconnaissance data (hereinafter collectively referred to as "surveillance information") from an object of interest. The device of the present disclosure can securely transmit the obtained surveillance information to a centralized processing center, such as an Air Operations Center (AOC), using encrypted communications.

Figure 1:
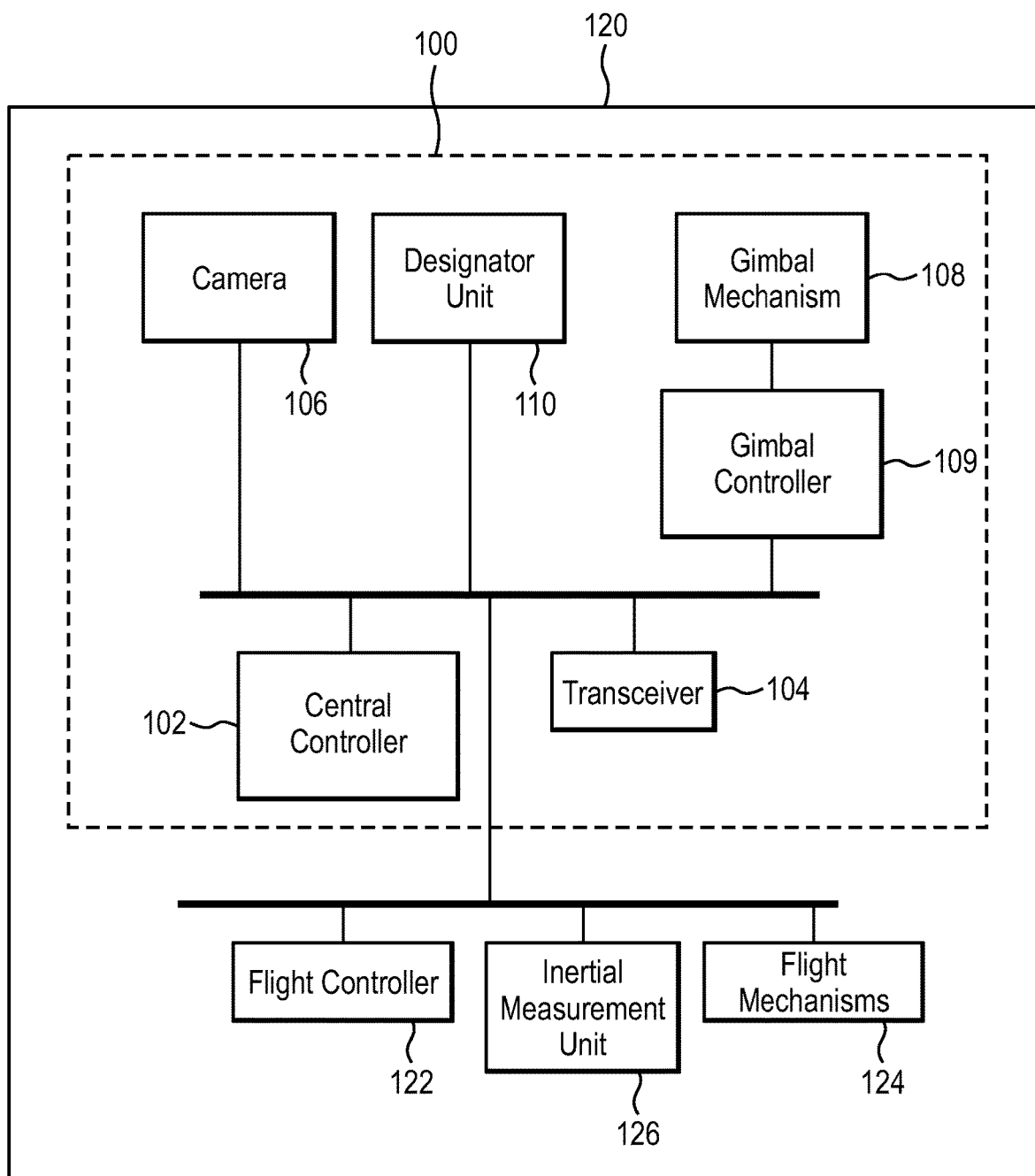
FIG. 1 depicts a block diagram illustrating aspects of the device and the unmanned aerial vehicle.

FIG. 1 is a block diagram illustrating an exemplary embodiment of a device 100 according to the present disclosure. According to an exemplary embodiment, the device 100 is attached, either removably or permanently (e.g., fixedly attached), to a remotely controlled vehicle 120, such as an unmanned aerial vehicle (UAV), for example.

The device 100 includes a central controller 102, a transceiver 104, one or more cameras 106, a gimbal mechanism 108, a gimbal controller 109, and a designator unit 110. The central controller 102 controls the operations of the device and the individual components of the device 100. The central controller 102 includes a computer processor (CPU) that is configured to control the operations of the device 100 as described herein, as well as communications between the components of the device 100. According to an exemplary embodiment, the computer processor may be, for example, (i) a general-purpose processor executing the x86 instruction set such as those processors produced by Intel® or AMD®, or (ii) a general-purpose processor executing other common instruction sets including ARM®, Power ISA®, MIPS®, and ODROID®. Alternatively, the computer processor may be an application specific processor such as an application-specific integrated circuit (ASIC), a programmable logic controller (PLC), a field-programmable gate array (FPGA), or a Digital Signal Control (DSC) processor. In some instances, the computer processor may be included in a System-on-a-Chip (SOC) that includes other aspects of the device 100 such as the components needed to communicate with the other components of the device 100 as described herein. In other instances, multiple discrete processors with different capabilities, including the exemplary processors described above, may cooperate to effectively operate as a single computer processor. The central controller 102 includes at least one non-transitory, non-volatile memory (MEM) on which a computer program and/or computer-readable instructions is/are tangibly recorded. The computer processor is configured to execute the program and/or instructions recorded on the MEM to carry out the operations and functions of the device 100 as described herein. The central controller 102 can also include a working memory such as a random access memory (RAM) to utilize while performing its functions. The RAM and MEM can be provided separately from the computer processor, for example, in a different physical unit from the computer processor. The MEM may be any type of non-transitory, non-volatile memory such as a read only memory (ROM), hard disk drive, flash memory, optical memory, etc.

The device 100 is particularly suitable for use with UAVs 120 of various designs. In some embodiments, the UAV 120 will include specific structures suitable for retaining and securing the device 100 during operation. The UAV 120 may include a plurality of motors for flight. The motors drive at least one propeller to provide the propulsion necessary for flight. In at least some embodiments, characteristics of the motors and the performance of the motors may be used by the device 100 when orienting the gimbal mechanism 108 described below. Additionally, the UAV 120 may include sensors such as global positioning system (GPS) sensors, satellite or other communications modules, downlinks suitable for use with United States Air Force systems, synthetic-aperture radar, and other suitable components. In at least some embodiments, the communications modules may communicate with either ground control stations or other vehicles operating in the vicinity.

According to an exemplary embodiment, the camera 106 is configured to obtain image data of an object of interest based on a position of the UAV 120. For example, the camera 106 can obtain high definition (HD) video of one or more objects of interests in an area proximate to a current location of the UAV 120. The transceiver 104 is configured to receive operator controls from an operator of the device 100 and to output the image data obtained by the camera 106. An individual can operate the device 100 from a central command facility and/or by using a portable computing device (e.g., a tablet computer such as an Android tablet, a laptop computer, etc.) in a location remote from the position of the UAV 120.

The designator unit 110 is configured to emit a light source (e.g., laser light, infrared light, thermal imaging) onto a surface of an object of interest to illuminate that surface when a designation command is received from the operator of the device 100. According to an exemplary embodiment, the central controller 102 is configured to receive the designation command from the operator based on a designation of the object in the of interest in the image data outputted to an operator controller of the operator.

The designator unit 110 can emit the light source according to a predetermined pulse pattern. For example, in some military situations, certain munitions such as a Hellfire missile are operated according to a predefined lasing signature, wherein the munitions look for that signature. In such applications, the designator unit 110 is configured to emit a light source (e.g., laser light) according to a specific pattern (e.g., lasing pattern) for operation with a particular type of munitions. The designation pattern may be accomplished in accordance with published military regulations, tactics, techniques, and procedures. In the exemplary embodiments described below, the designator unit 110 is described as outputting laser light. However, it is to be understood that the designator unit 110 can output different types of light (e.g., infrared light, thermal imaging) in lieu of laser light or in conjunction with laser light. For example, in search and rescue missions, the use of infrared light may be desirable due to environmental conditions and/or the time of day.

The gimbal mechanism 108 has a plurality of motors configured to orient the designator unit 110. The designator unit 110 is mounted onto a support allowing for movement of the designator unit 110 independent of the UAV 120. In addition to the designator unit 110, in some embodiments, the camera 106 may also be mounted on the support. In at least some embodiments, the support is a gimbal mechanism 108 that allows for movement along the x, y, and z-axes so that any pitch, roll, and yaw of the UAV 120 may be corrected. The gimbal mechanism 108 includes actuators that allows for a gimbal controller 109 to adjust position. The gimbal controller 109 considers inputs from at least one inertial measurement unit so that the movement of the UAV 120 from a fixed location and position is detected and measured. According to an exemplary embodiment, the gimbal mechanism 108 has at least three motors to operate the designator unit 110, and possibly the camera 106, in three degrees of motion (pitch/roll/yaw).

According to an exemplary embodiment, the gimbal controller 109 is configured to control the plurality of motors of the gimbal mechanism 108. The gimbal controller 109 may include an inertial measurement unit which is separate from any similar measurement device on the UAV 120. By incorporating an inertial measurement unit in the device 100, a wider variety of vehicles 120 may be utilized as platforms for carrying the device 100 because no particular data interface is needed to communicate with the device 100 and the UAV 120. In some embodiments, the gimbal controller 109 may instead utilize an inertial measurement unit 126 that is included with the UAV 120. In certain embodiments, the device 100 may include an inertial measurement unit but nevertheless communicate with the inertial measurement unit 126 included with the UAV 120 to confirm and/or improve the accuracy of the information being obtained by the inertial measurement unit. During operation, the gimbal controller 109 detects the change in the position of the UAV 120 after the designator unit 110 has been placed onto a target. The gimbal controller 109 considers this change in combination with the relative orientation of the designator unit 110 and generates a control signal for the actuators of the gimbal mechanism 108 so that the designator unit 110 remains oriented at the target. In addition to the change in position, the gimbal controller 109 may consider other factors such as limitations on the movement of the designator unit 110 resulting from, for example, fixed structures on the UAV 120 which may preclude certain ranges of movement, or fixed structures on the UAV 120 which may prevent the designator unit 110 from illuminating the target.

Although the above sequence of operations by the gimbal controller 109 executes in a feedback loop to correct for movements of the UAV 120 so that the designator unit 110 may continue to illuminate for a certain target, there is at least a small delay between the movement of the UAV 120 and the correction by the gimbal controller 109. Further, it is also desirable to continue to orient the camera 106 towards the target. Accordingly, in some embodiments, in addition to the adjustments made by the gimbal controller 109 so that the designator unit 110 may illuminate a certain target, image processing may also need to occur so that the image being transmitted to the operator from the camera 106 remains focused on the target.

In this scenario, the information from the inertial measurement unit in combination with the actual orientation of the camera 106 on the gimbal mechanism 108 is used to derive the resulting error in correction resulting from the commands transmitted to the gimbal mechanism 108. Such errors may result from the inability of the actuator to precisely orient the gimbal mechanism 108 to correct for the movement of the UAV 120, differences between the actual movement of the gimbal mechanism 108 versus the desired movement of the gimbal mechanism 108, and misalignment of the camera 106 on the gimbal mechanism 108. The resulting error is considered by the central controller 102 and images being transmitted from the camera 106 to the operator are cropped or otherwise adjusted so that the target remains in the images. The operator will then be able to observe the target via the camera 106 without being affected by movements of the UAV 120.

In at least some embodiments, the operator may issue a command correcting the designation of the target. For example, the execution of the above sequence may result in the camera 106 providing images where the target is not centered or otherwise appropriately placed in the resulting image. The operator may then issue commands to the gimbal mechanism 108 through the gimbal controller 109 which compensates for this placement. This input by the operator is then considered by the gimbal controller 109 and the central controller 102 so that future adjustments will consider the operator's input.

Figure 2:
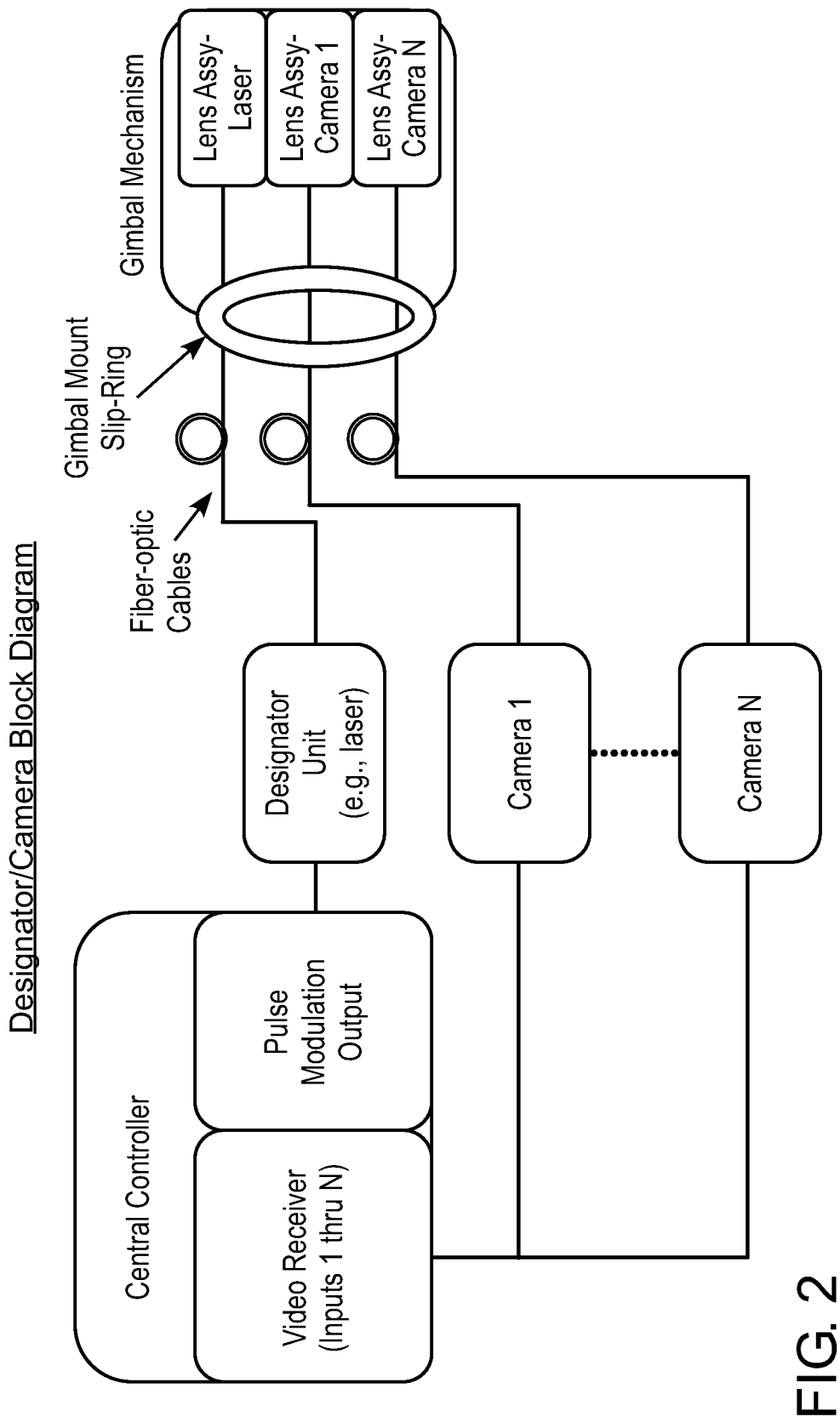
FIG. 2 depicts a block diagram of the features of the designator unit in connection with the functions of the central controller, the gimbal mechanism, and the gimbal controller.

In at least some embodiments, both the designator unit 110 and the camera 106 are mounted on the gimbal mechanism 108. Each of the components are connected to other components of the UAV 120 by way of fiber optic cable or other appropriate connections. The connections are routed through a slip-ring of the gimbal mount 108 so that the overall weight of the device 100 is reduced. In at least some embodiments a lens assembly is mounted to the gimbal mechanism 108 so that the designator unit 110 may be easily replaced. The lens assembly in this embodiment may be boresight-aligned or aligned in any other desirable manner so that the orientation of the gimbal mechanism 108 results in the appropriate orientation of the lens assembly. In this configuration, both the lens assembly and the designator unit 110 are moved by the gimbal mechanism 108 simultaneously so that the desired orientation is maintained. This configuration is particularly suitable when, for example, the designator unit 110 needs to emit a light source that has a specific pulse modulation and/or a particular scheme so that a detector may identify the light source and the target. As a result, the designator unit 110 may be replaced as needed to provide the desired light source. FIG. 2 illustrates a block diagram of the features of the designator unit 110 in connection with the functions of the central controller 102, the gimbal mechanism 108 and the gimbal controller 109.

The central controller 102 is configured to receive flight information of the UAV 120 based on the position of the UAV 120 from the flight controller 122 of the UAV 120. The central controller 102 is configured to control the designator unit 110 to continuously emit the light source onto the surface of the object of interest irrespective of the position of the UAV 120. The central controller 102 is configured to compensate for an orientation of the designator unit 110 based on movement of the UAV 120 such that the designator unit continuously illuminates (e.g., is "locked on" to) the surface of the object of interest. The designator unit 110 remains locked onto the target until disabled by the user.

Accordingly, the designator unit 110 is configured to, by way of control from the central controller 102, emit a laser onto a surface of an object of interest and thereby illuminate that surface (e.g., a target of interest) continuously irrespective of the position or orientation of the UAV 120. The camera 106 may be a hi-definition video camera, for example. FIGS. 3-7 provide several views of the designator unit 110 and camera installed on an aerial vehicle, according to exemplary embodiments of the present disclosure.

In accordance with an exemplary embodiment of the present disclosure, the laser designator unit is configured to control the laser so that the laser remains locked on the object of interest (e.g., target) irrespective of any movement of the aerial vehicle to which the laser designator unit is attached.

Figure 9:
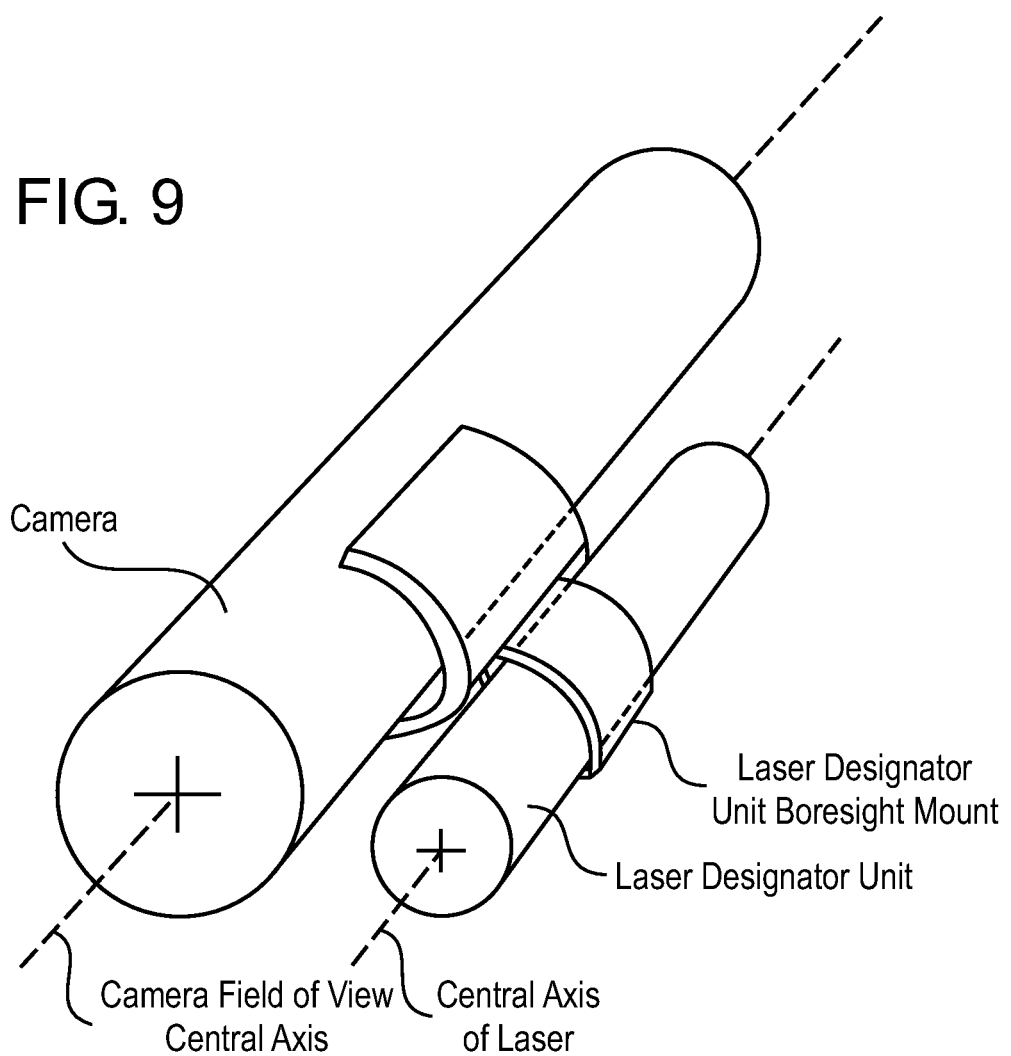
FIG. 9 depicts the camera field of view and central axis of the camera and the designator unit field of view and central axis of the designator unit.

FIG. 9 illustrates an exemplary embodiment of the laser designator unit mounted in conjunction with the camera. According to the illustrated embodiment, the laser designator unit is held to the camera by a boresight mount. This arrangement allows for the central axis of the laser designator unit to be aligned with (e.g., parallel with) the central axis of the field of view of the camera. According to an exemplary embodiment, the laser mount is adjustable to allow for boresight adjustment, and the laser mount can be fixed in place for long-distance applications. The specifications of the laser (e.g., wavelength, power, spot size, etc.) are selected in accordance with the requirements of the application of the device 100. In accordance with an exemplary embodiment, the laser designator unit is lightweight so that the device 100 is lightweight, and to minimize effects on the mount (e.g., gimbal mount) of the camera.

In addition, the device 100 is configured to integrate with existing intelligence and recovery systems. For example, the device 100 is configured to integrate with ATAK which is also on display at the centralized processing center.

Furthermore, PARTI includes software-defined radios that are frequency agile to mitigate jamming and hacking attempts to take control of the bird. The device 100 includes an application (see FIG. 10) that controls video recording, laser targeting, flight control and also a "bug out" mode which allows the device 100 to remain on station and continuously lase a target while automatically performing aggressive evasive maneuvers to defeat attempts to cause the aerial vehicle to cease its operations, for example.

Exemplary features of the present disclosure are described below with respect to an exemplary application of the device 100. In this example, the device 100 is utilized in a military situation in which a military team approaches an encampment of adversaries to perform reconnaissance and target the area of interest. Once the aerial vehicle is airborne, the enemy troops may notice the small platform flying overhead and deduce there may be a team of opposing troops nearby controlling it. As the enemy troops attempt to knock the aerial vehicle out of the sky, a spotter of the military team utilizing the device 100 controls the aerial vehicle to fly out of harm's way and begins "painting" (illuminating) the encampment's main bunker with an infrared designation laser to guide smart munitions to their target.

Enabling the military team to illuminate the area of interest with the laser and then move the aerial vehicle so that it is out of harm's way creates a number of advantages. For example, using known devices, military teams seeking to illuminate an area of interest so that it is targeted for smart munitions would have to get dangerously close to an adversary, mark the location with a stationary laser unit, and remain in place until the target can be attacked by airborne or artillery assets. Often, this results in the need for the operators to call "danger close" strikes, which increase the likelihood of the operator themselves being injured along with the enemy. However, such "danger close" strikes can be avoided by utilizing the device 100 of the present disclosure, since the device 100 can illuminate an area of interest even while being flown away from the area of interest, since the laser designator unit is configured to control the laser so that the laser remains locked on the target of interest irrespective of any movement of the aerial vehicle to which the laser designator unit is attached.

The enemy forces may soon begin cyber-attacks in an effort to gain control of and land the aerial vehicle. However, according to an exemplary embodiment, the application the military team is using (see FIG. 10) resides on a secure mobile platform and is being transmitted via approved encrypted tunnels which prevents interference with the application. An exemplary embodiment of the secure mobile platform utilized by the device of the present disclosure is illustrated in FIG. 11. According to an exemplary embodiment, the device 100 of the present disclosure is configured to communicate with a centralized processing center by means of a virtual private network (VPN) using software-defined radios operating according to USRP (universal software radio peripheral). The communication from the aircraft and the ground-station may be done using a fully dynamic and customizable software defined radios (onboard the platform and within the mobile ground station) that emulate a TCP/IP stack, automatic switching between various frequencies to avoid jamming, and end-to-end encryption (e.g., dual layer 256-bit AES encryption) to mitigate risk of hacking/cyber-attack while maintaining a reliable data link.

Moreover, even when the enemy troops are attempting to interfere with the aerial vehicle, the device 100 can be placed into "auto/bug-out" mode, in which a pre-programmed set of maneuvers are carried out to keep the aircraft aloft and the laser on target for as long as possible even after the team has to leave the area. Once fast-moving air assets arrive on station, they deliver their weapons which follow the laser designation in and the target is destroyed with no additional risk to the military team.

The device 100 of the present disclosure provides a unique solution to solve several recognized Prioritized Technology Gaps (PTG) for military operations, as well as recovery, emergency and law enforcement situations. Additional use cases involve using the device of the present disclosure to collect intelligence, surveillance and reconnaissance (ISR) in hostile areas or areas where natural/man-made disasters (e.g., chemical/nuclear contamination, flood, fire, riot, covert etc.) make sending in human beings impractical and/or dangerous. Also, the present disclosure addresses situations where large aerial platforms would be cost prohibitive.

As discussed above with reference to FIG. 10, the device 100 of the present disclosure utilizes a mobile application. According to an exemplary embodiment, the mobile application is a Scala-based application that allows live streaming video, real time flight controllers, and features a large array of flight modes and graphing of the craft's geo-location on a geospatial map. According to an exemplary embodiment, the application is built using a Simple Build Tool (SBT) for the Android platform, although this is just an example, and the present disclosure is not limited to this platform. The application operates on a Virtual Private Network (VPN) communication channel and sends encrypted (e.g., Mavlink) messages to the aircraft. The application also provides haptic feedback on the operator interface for optimal operator control. Furthermore, the application comes with a Heads Up Display (HUD), status message, flight logs and allows users to create and deploy simple flight plans.

Other features of the device 100 include, for example:

Persistent lasing of a target while mitigating the risk of danger/capture of operators Small, low-cost, collapsible man portable carrier (e.g., backpack/rugged case) C4ISR platform capable of above cloud/inclement weather flight Automatic "bug out" mode capable of performing aggressive "shoot-down avoidance" maneuvers while keeping laser locked on to target should the operator need to depart the area Dynamic payload capability that can be quickly changed out based on the operation or mission Real time graphing a Geolocation Gimbal, Laser and Camera Controls Built in touchscreen joystick overlay with haptic feedback.

No rooting or hardware mods required.

Map view

Parameter editing (with parameter documentation)

Waypoint editing (including setting waypoint type/parameters etc.)

Follow-me mode to have the craft follow you (user defined)

Lead-it mode to steer/move vehicle by turning your body and tilting the tablet

Vehicle mode display & control (AUTO, STABILIZE, etc.)

Speech output (for mode, altitude and battery alerts)

Capture log files to sdcard

Direct connect to USB on the APM (the only Android GCS with this feature)

RC channel 'raw' view

3DR telemetry module support

Warnings for low battery, low rssi, or low GPS sat count

Fully android 'native' (Scala backend talks directly to the USB device and renders the frontend)

UDP link (either as a client or a server)

TCP link (as a client)

Bugout Mode: Custom mode that allows the aircraft mounted laser designator to remain locked on to the target while the aircraft automatically performs aggressive shoot down avoidance maneuvers. This allows the operator to depart the area if necessary.

In accordance with an exemplary embodiment, the device 100 is a small, collapsible, carbon fiber and aircraft aluminum framed multi-rotor platform that can be carried by a person and is capable of above-cloud (up to 13,000 feet) flight. Exemplary features of the device include a hybrid electric battery and small gasoline powered alternator power plant with energy harvesting piezo and solar circuitry; a remote operated dispenser rack system that can deploy small sensors and other packages; a weather proof three-axis slip ring gyro stabilized gimbaled 5 mw Infrared laser designator/4000p hi-definition streaming CMOS video camera unit; and remote activation of laser, camera, gimbal from the application.

According to an exemplary embodiment, the frame of the aerial vehicle (hereinafter "airframe") can be customized to accommodate payload and size constraints for a particular application. The airframe can be constructed, for example, out of stamped carbon plates, carbon tubes, and customizable 3D printed carbon connections and brackets. The airframe can be constructed to be foldable in some way. For example, the arms of the airframe can be configured to fold vertically down to form a cage around the sensor payload. In accordance with an exemplary embodiment, the airframe can be appropriately sized according to the size and weight of the Gimbal/Sensor pod.

According to an exemplary embodiment, the device of the present disclosure can be carried or transported with a custom molded weather proof, watertight backpack carrier designed to integrate with standard MOLLE harnesses.

Figure 12:
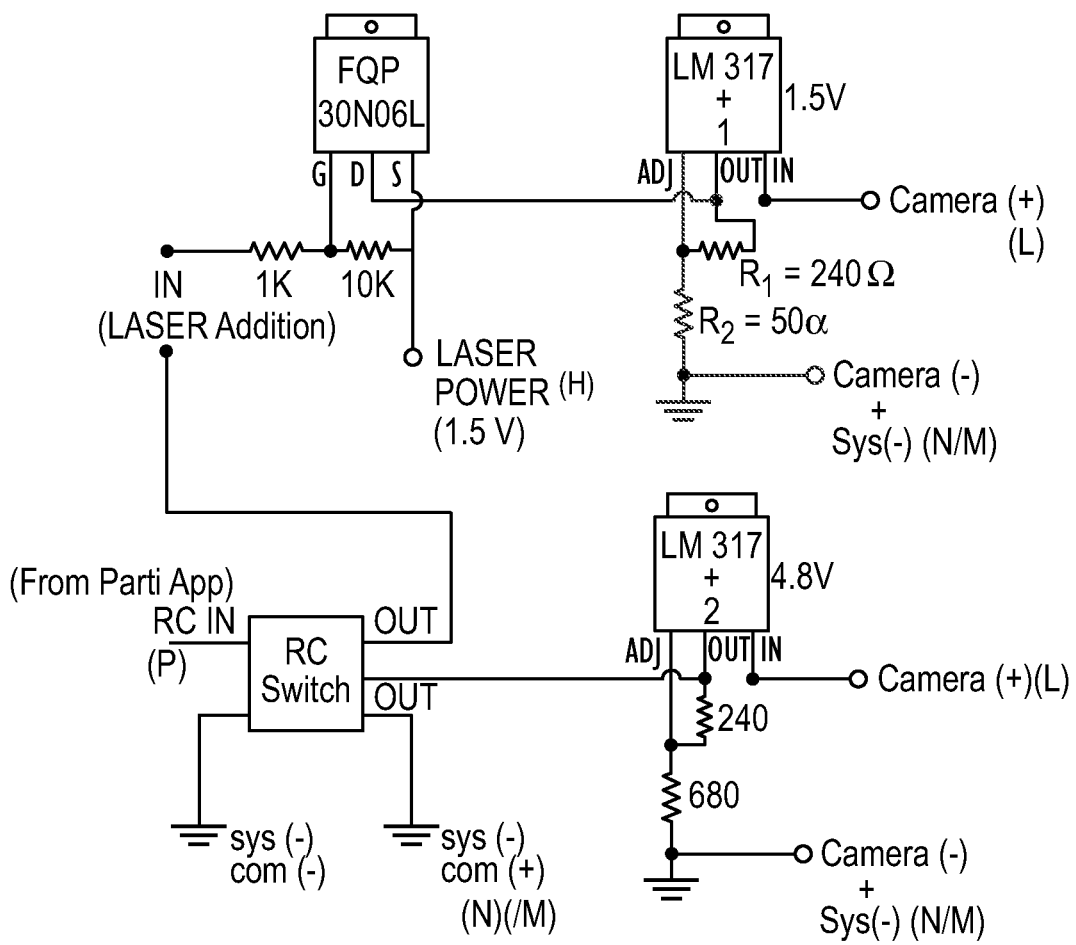
FIG. 12 depicts an embodiment of the circuit for laser and camera activation.
Figure 13:
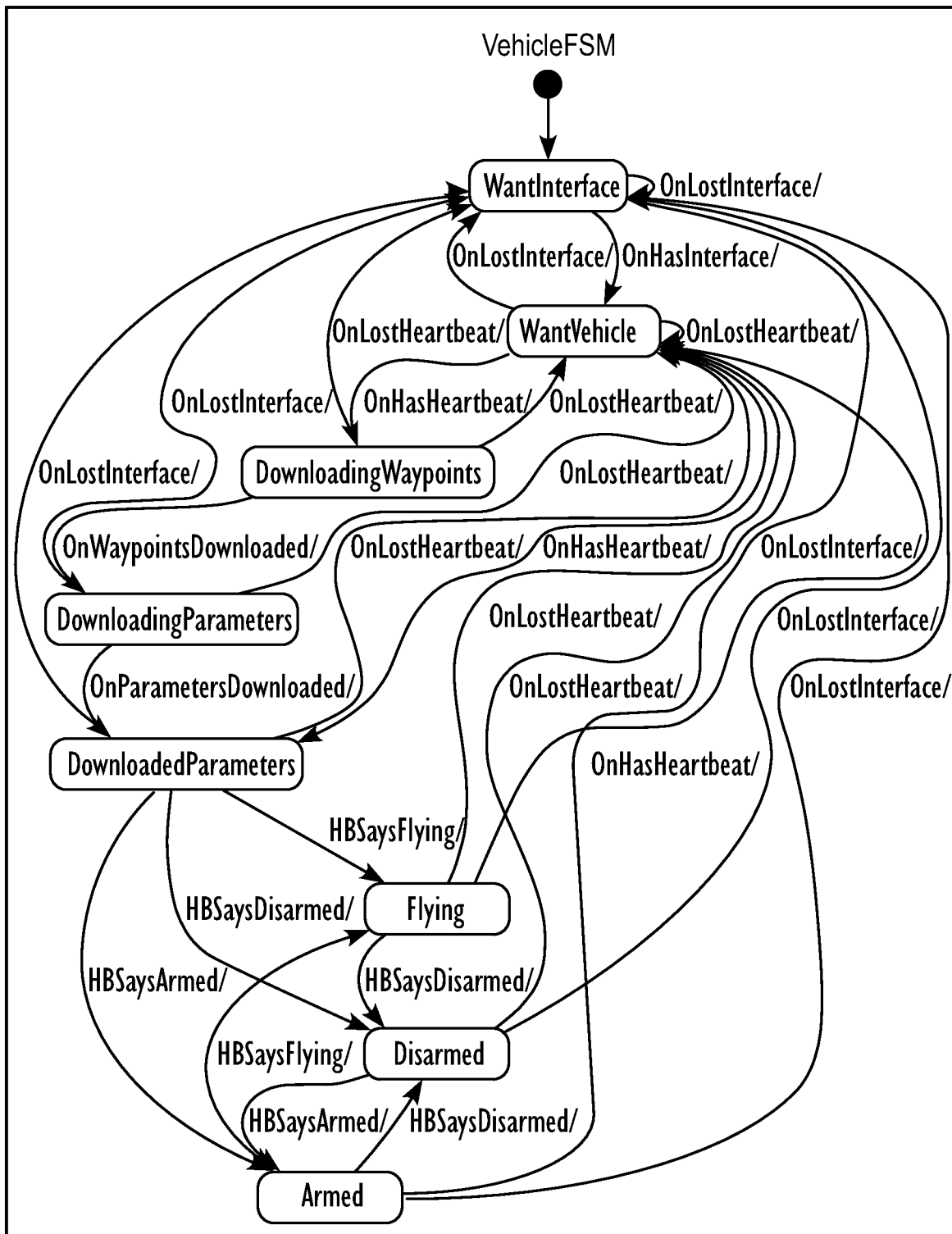
FIG. 13 depicts the interface used in one embodiment.

The operative features of the present disclosure were described above with regard to the functions performed by the device 100, camera 106 and aerial vehicle 120. It is to be understood that the device, camera and aerial vehicle each respectively include processing circuitry which includes at least one processor and a non-transitory computer-readable recording medium (e.g., ROM, hard disk drive, flash memory, optical memory, etc.) that has recorded thereon a computer program that, when executed by the processor, causes the processor to perform the operative features of that device. The processor can be a general-purpose processor (e.g., processors produced by Odroid, Intel or AMD) configured to execute the computer program tangibly recorded on the non-transitory computer-readable recording medium. Alternatively, the processor can be an application specific processor that is specifically configured to carry out the operative features described herein. FIG. 12 illustrates an exemplary embodiment of processing circuitry of the designator unit. FIG. 13 is an exemplary embodiment of computer-readable instructions executed by the processing circuitry of the device.

FIG. 1 depicts a block diagram that illustrates components of the device 100 and the UAV 120 including the central controller 102, the transceiver 104, the camera 106, the gimbal mechanism 108, the gimbal controller 109, the designator unit 110, the flight controller 122, the flight mechanisms 124, and the inertial measurement unit 126.

FIG. 2 depicts the designator unit 110 and camera 106 block diagrams.

Figure 3A:
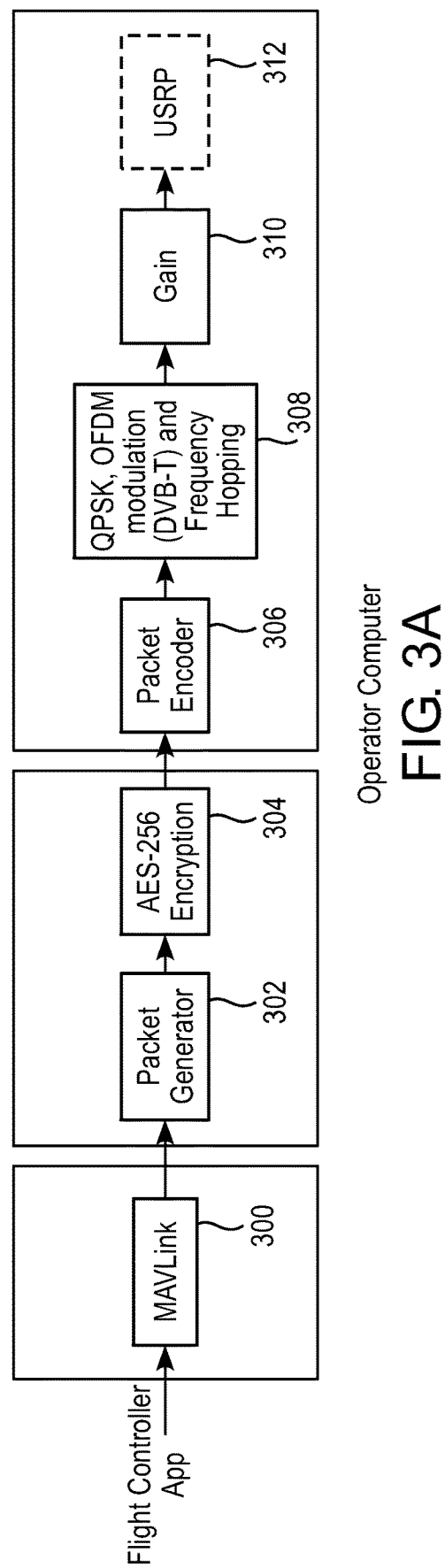
FIGS. 3A-3D depict block diagrams illustrating components of the operator computer and the central controller.

FIG. 3A depicts the components involved with the transmission of commands from the flight controller app of the operator computer including the MAVLink 300, the packet generator 302, an AES-256 encrypter 304, the packet encoder 306, a module for QPSK, OFDM modulation and frequency hopping 308, a gain module 310, and a USRP module 312.

Figure 3B:
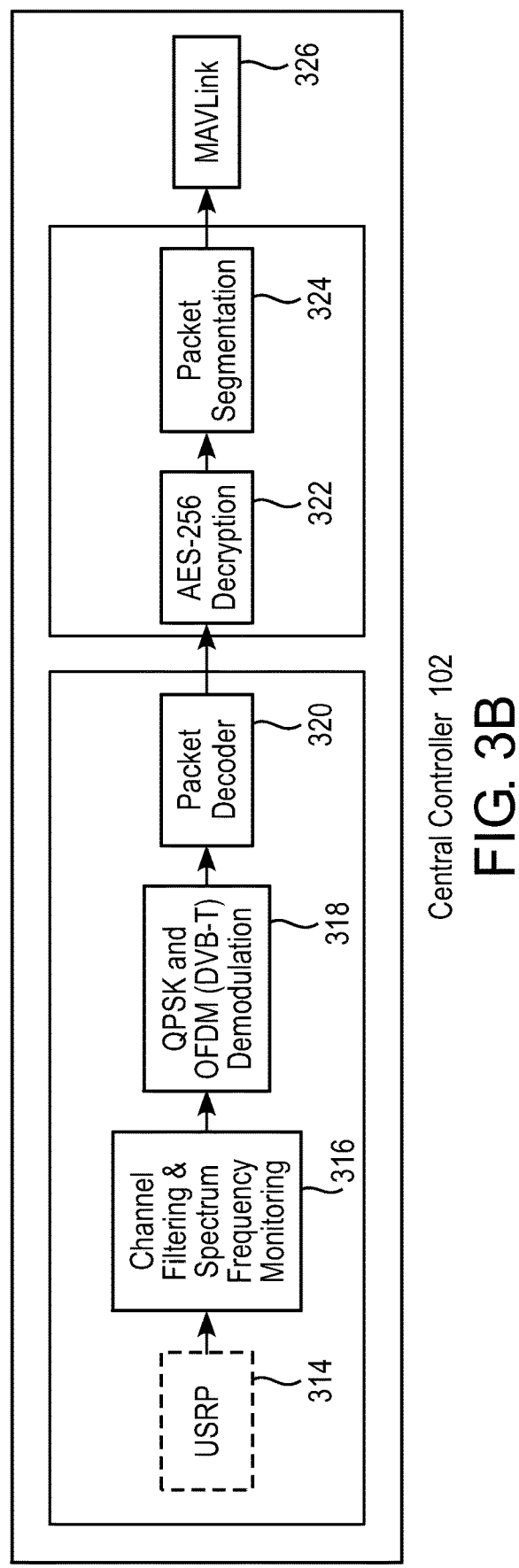

FIG. 3B depicts the components involved with the reception of commands from the operator computer including the USRP module 314, the channel filtering and spectrum frequency monitoring module 316, the QPSK and OFDM demodulation module 318, the packet decoder 320, the AES-256 decrypter 322, the packet segmentation module 324, and the MAVLink 326.

Figure 3C:
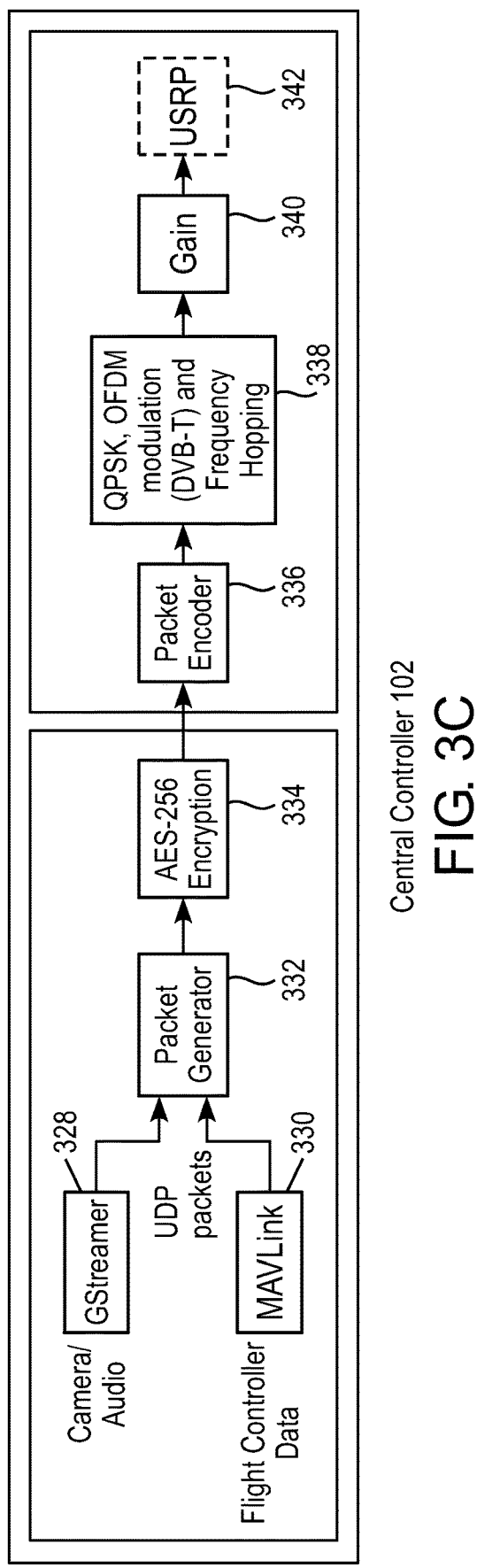

FIG. 3C depicts the components involved with the transmission of information from the UAV 120 including a gstreamer module 328, the MAVLink 330, the packet generator 332, the AES-256 encrypter 334, the packet encoder 336, the QPSK, OFDM modulation and frequency hopping module 338, the gain module 40, and the USRP module 342.

Figure 3D:
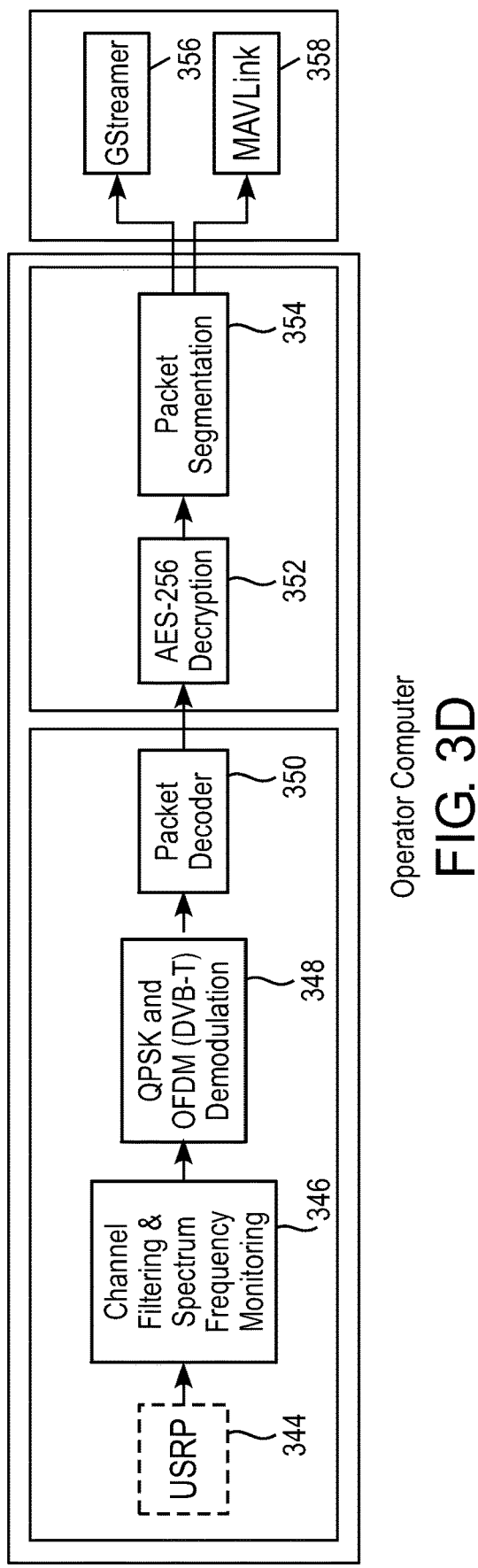
Figure 4:
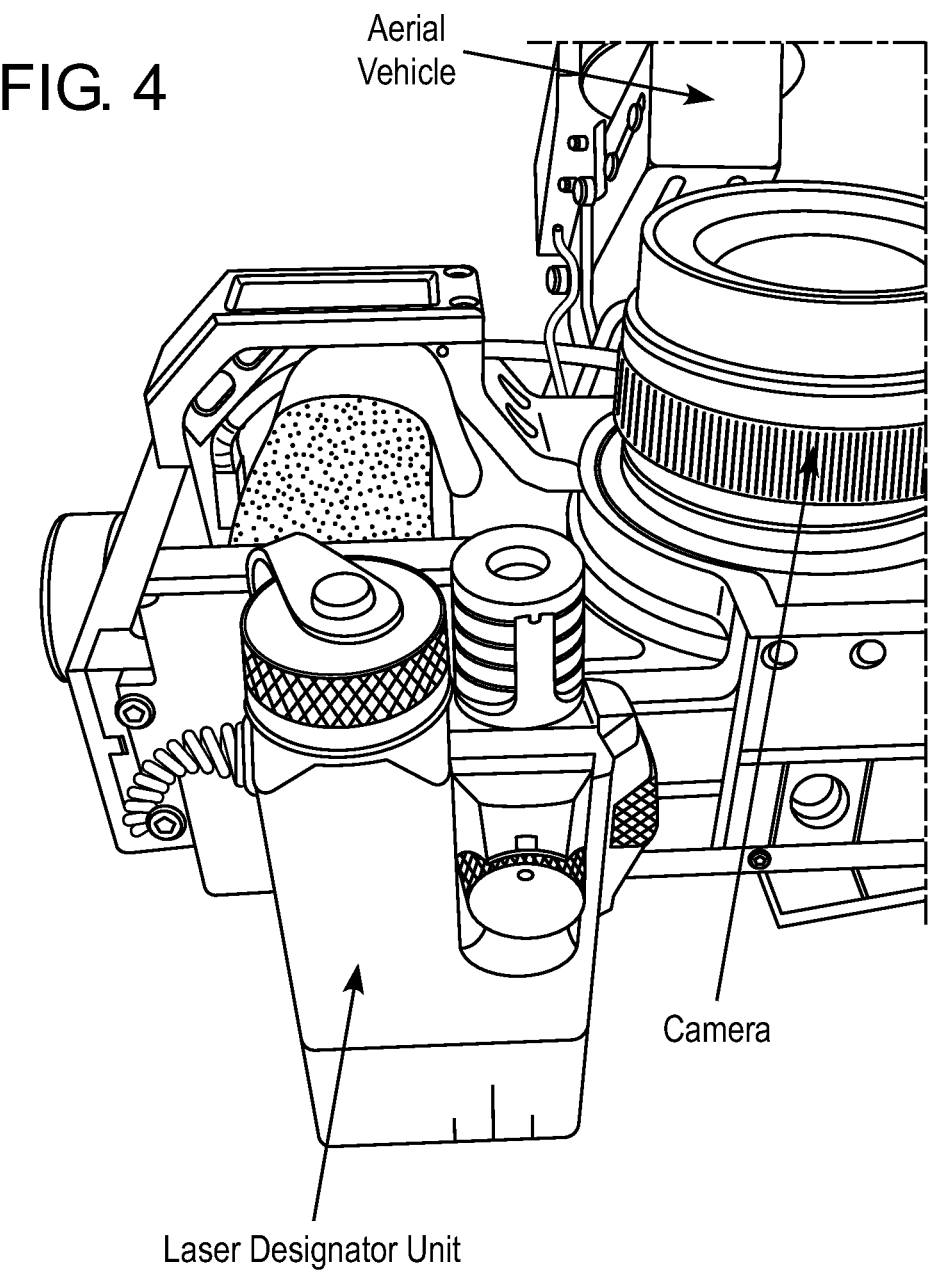
FIG. 4 depicts one embodiment of the device with the designator unit and the camera.
Figure 5:
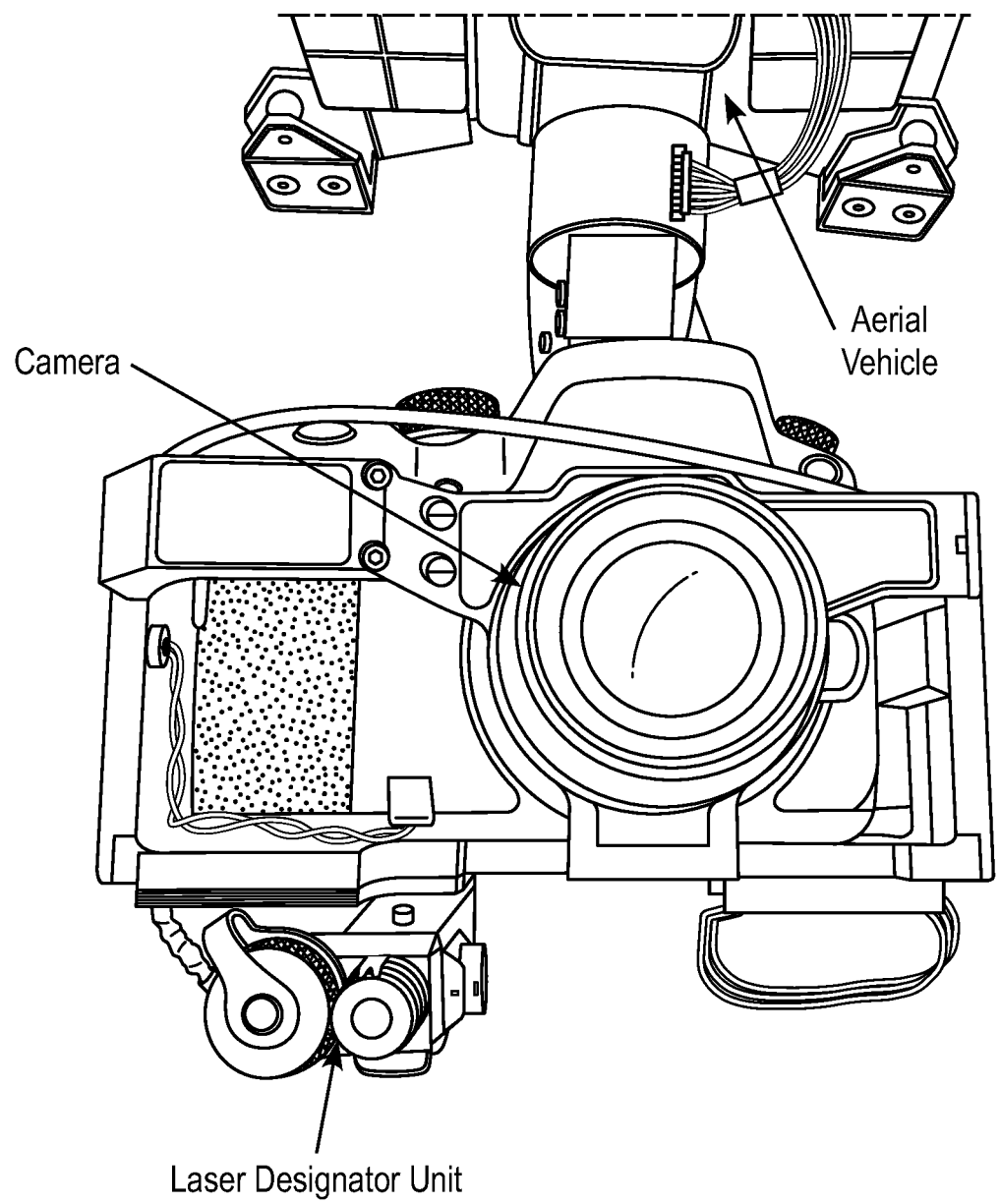
FIG. 5 depicts another view of the embodiment shown in FIG. 4.
Figure 6:
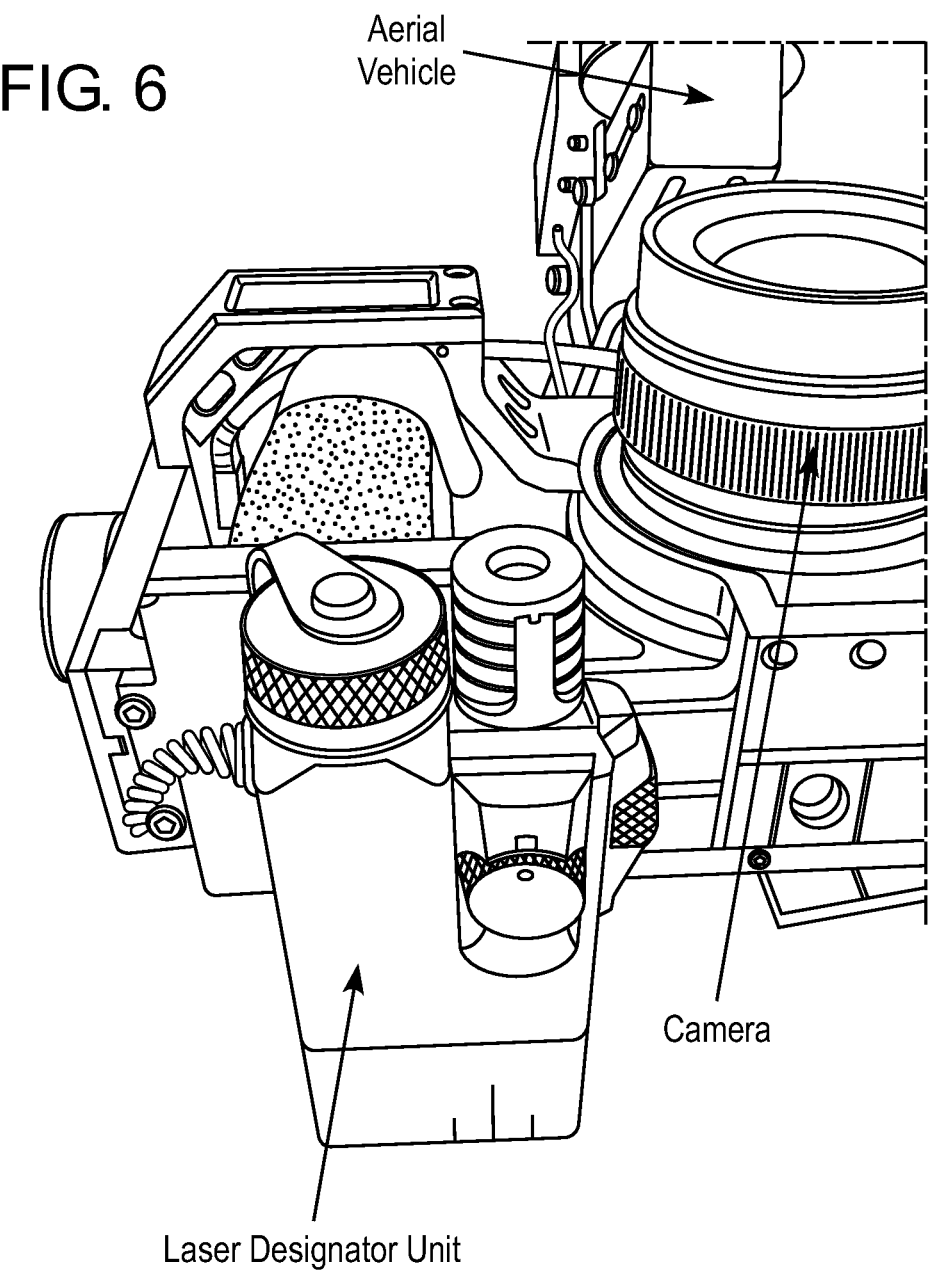
FIG. 6 depicts another view of the embodiment shown in FIG. 4.
Figure 7:
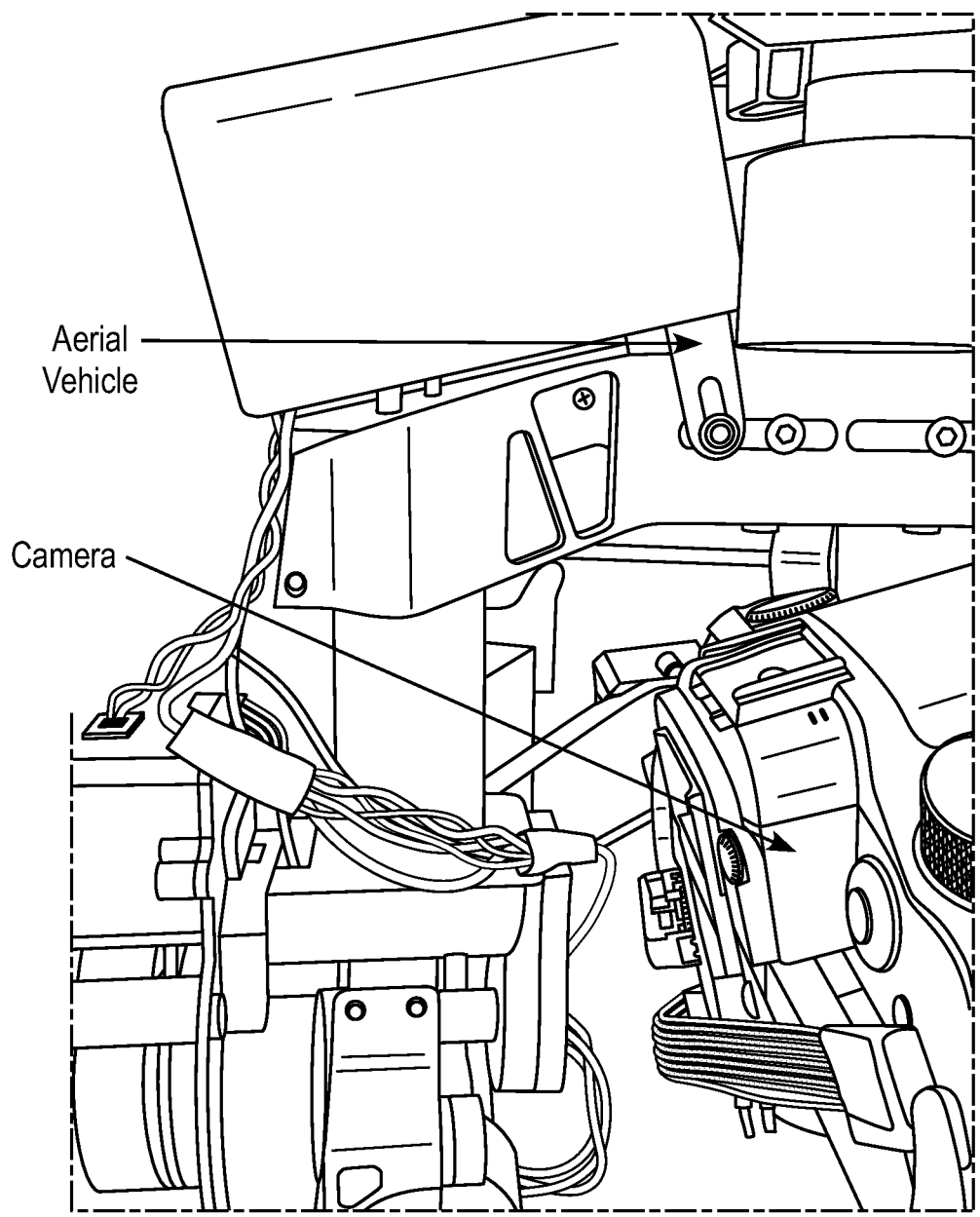
FIG. 7 depicts another view of the embodiment shown in FIG. 4.
Figure 8:
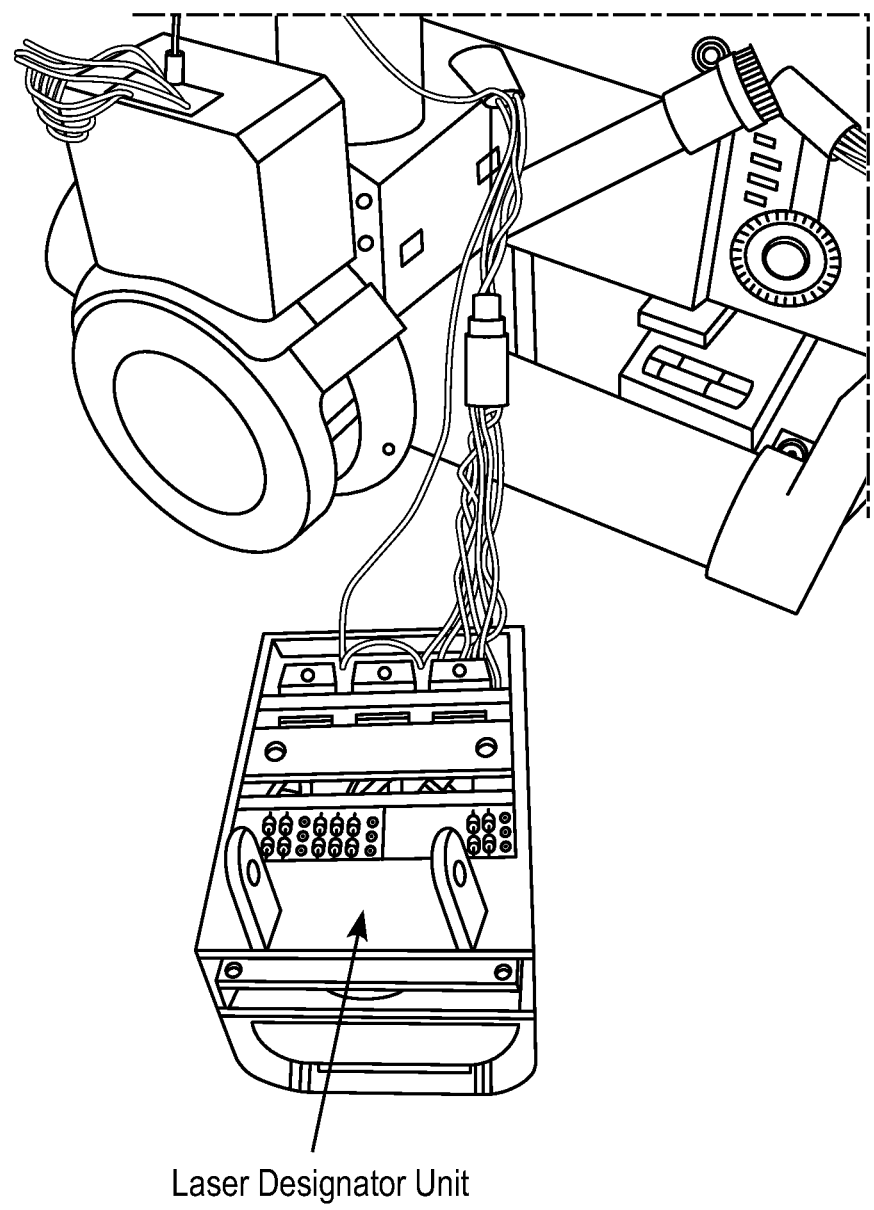
FIG. 8 depicts one embodiment of the designator unit 110.

FIG. 3D depicts the components involved with the reception of information from the UAV 120 including the USRP module 34, the channel filtering and spectrum frequency monitoring module 346, the QPSK and OFDM demodulation module 348, the packet decoder 350, the AES-256 decrypter 352, the packet segmentation module 354, the gstreamer module 356, and the MAVLink 358.

FIGS. 4-8 depict the designator unit 110, the camera 106, and the UAV 120.

FIG. 9 depicts the camera 106 field of view and central axis, along with the central axis of the designator unit 110. In this embodiment, the designator unit 110 is boresighted.

Figure 10:
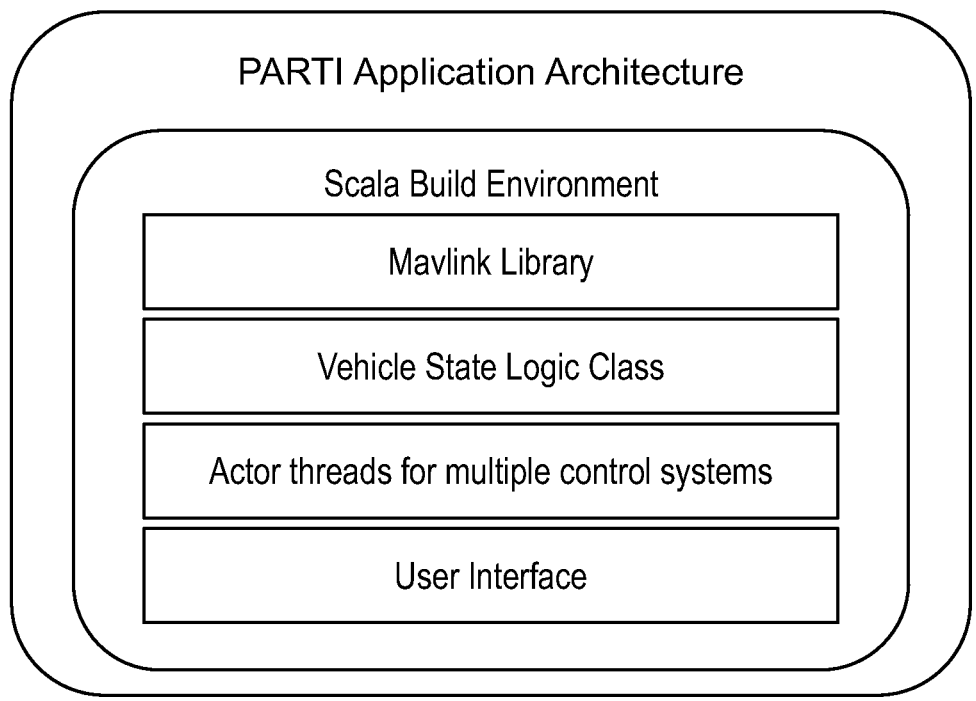
FIG. 10 depicts an application architecture of one embodiment.
Figure 11:
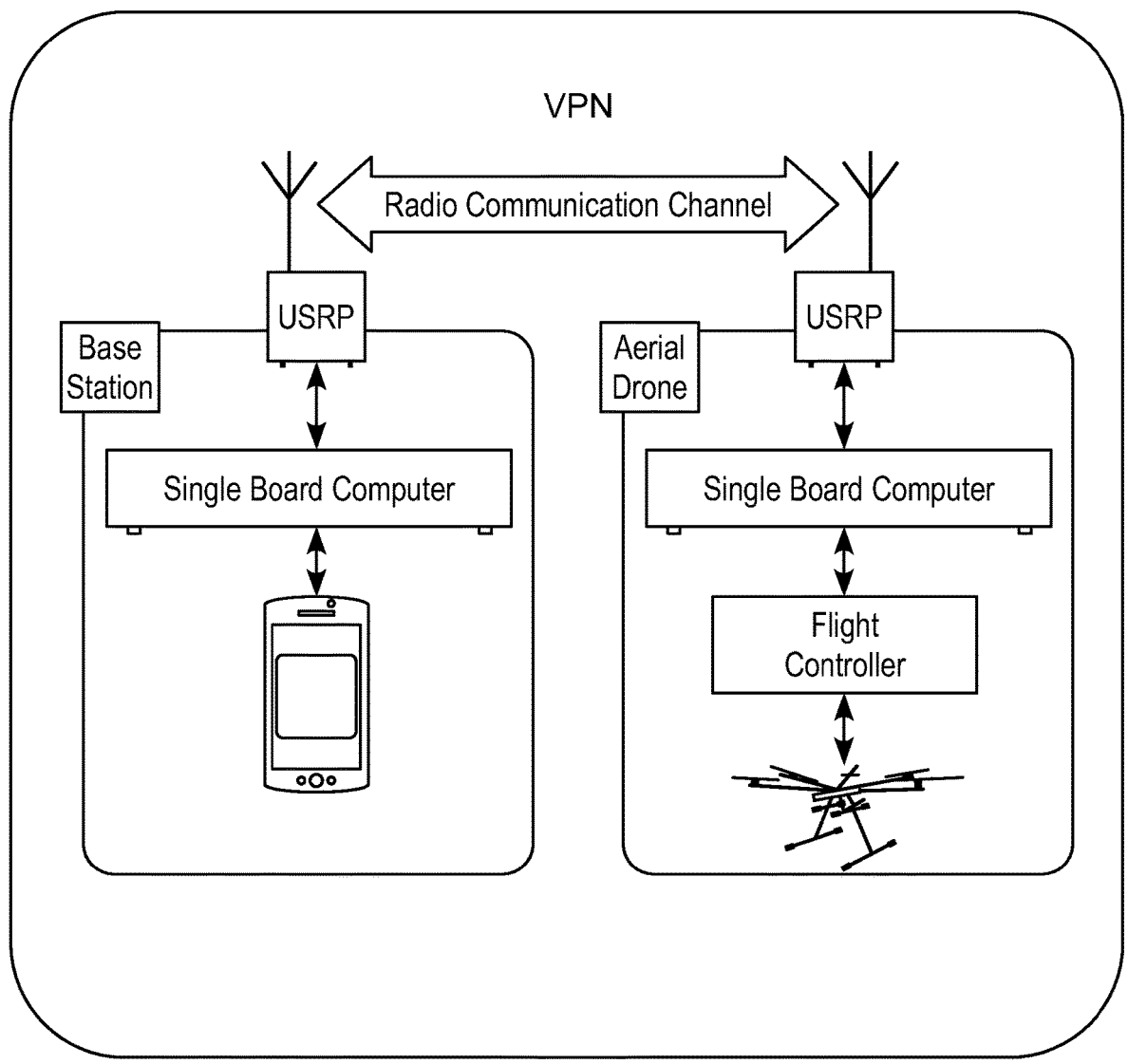
FIG. 11 depicts one embodiment of the communications mechanism employed to connect the operator computer with the unmanned aerial vehicle.

FIG. 10 depicts an application architecture.

FIG. 11 depicts a communications mechanism employed to connect the operator computer with the UAV 120.

FIG. 12 depicts an embodiment of the circuit for laser and camera activation.

FIG. 13 depicts the interface used in one embodiment.

It will be appreciated by those skilled in the art that the present invention can be embodied in other specific forms without departing from the spirit or essential characteristics thereof. The presently disclosed embodiments are therefore considered in all respects to be illustrative and not restricted.

What is claimed is:

1. A device for obtaining surveillance information from an aerial vehicle, the device comprising:
   a camera including a lens assembly, the camera configured to obtain image data of an object of interest based on a position of the aerial vehicle;
   a transceiver configured to receive operator controls and to output the image data obtained by the camera;
   a designator unit configured to emit a light source onto a surface of an object of interest to illuminate that surface when a designation command is received from an operator;
   a gimbal mechanism having a plurality of motors configured to orient the designator unit and the lens assembly;
   a gimbal controller configured to control the plurality of motors of the gimbal mechanism to control orientation of the designator unit and the lens assembly simultaneously; and
   a central controller configured to receive flight information of the aerial vehicle based on the position of the aerial vehicle, and to control the designator unit to continuously emit the light source onto the surface of the object of interest irrespective of the position of the vehicle,
   wherein the central controller is configured to control the gimbal controller to compensate for an orientation of the designator unit based on movement of the aerial vehicle such that the designator unit continuously illuminates the surface of the object of interest regardless of a position of the aerial vehicle, and
   wherein the gimbal controller is configured to detect a change in position of the aerial vehicle after the designator unit, at a first orientation, has emitted the light source onto the surface of the object of interest while the aerial vehicle was in a first position, and to control the gimbal mechanism to reorient the designator unit relative to a second position of the aerial vehicle to cause the designator unit to emit, at the second orientation different from the first orientation, the light source onto the surface of the object at the second position of the aerial vehicle, such that the designator unit continuously illuminates the surface of the object of interest when the aerial vehicle is in the first position and the second position.

2. The device according to claim 1, wherein the central controller is configured to receive the flight information of the aerial vehicle from a flight controller of the aerial vehicle.

3. The device according to claim 1, wherein the central controller is configured to receive the operator controls over a secured communication channel established between the central controller and an operator controller of the operator, and to transmit the image data to the operator controller over the secured communication channel.

4. The device according to claim 1, wherein the central controller is configured to receive the designation command from the operator based on a designation of the object of interest in the image data outputted to an operator controller of the operator.

5. The device according to claim 1, wherein the central controller is configured to control the designator unit to continuously emit the light source onto the surface of the object until a command is received from the operator to stop emitting the light source onto the surface of the object.

6. The device according to claim 1, wherein the gimbal mechanism is configured for 3-axes of motion.

7. The device according to claim 3, wherein the secured communication channel is an encrypted channel.

8. The device according to claim 3, wherein the secured communication channel is an Android compatible channel.

9. The device according to claim 1, in combination with: a ground station.

10. The device of claim 1 in combination with a ground station, wherein the ground station is an Android device configured for end-to-end encryption.

11. The device according to claim 1, configured in combination with an aerial device.

12. The device according to claim 9, configured in combination with an aerial device.

13. The device according to claim 1, comprising:
a communication channel configured to mitigate jamming.

14. The device according to claim 1, wherein the central controller is configured to derive error in corrections resulting from movements of the gimbal mechanism based at least in part by processing of the image data.

15. A device for obtaining surveillance information from an aerial vehicle, the device comprising:
  a camera configured to obtain image data of an object of interest;
  a transceiver configured to output the image data obtained by the camera;
  a designator unit configured to emit a light source onto a surface of the object of interest to illuminate that surface;
  a gimbal mechanism having a plurality of motors configured to orient the designator unit and the camera;
  a gimbal controller configured to control the plurality of motors of the gimbal mechanism to simultaneously control orientation of the designator unit and the camera; and
  a central controller configured to:
    receive flight information of the aerial vehicle based on the position of the aerial vehicle;
    control the designator unit to continuously emit the light source onto the surface of the object of interest irrespective of the position of the aerial vehicle;
    control the camera to continuously remain focused on the object of interest irrespective of the position of the aerial vehicle;
    control the gimbal controller to compensate for movement of the aerial vehicle via a feedback loop, wherein the central controller receives and processes the image data and inertial measurement information of the aerial vehicle to derive resulting error from one or more of errors in positioning precision by the motors of the gimbal mechanism, misalignment of the camera, and time delays in receiving, processing, and effecting commands received by the central controller to maintain the continuous emission of the light source and focus of the camera on the object of interest.

* * * * *